United States Patent
Zhou

(10) Patent No.: US 8,670,400 B2
(45) Date of Patent: Mar. 11, 2014

(54) METHOD AND SYSTEM FOR ACQUIRING SERVING GENERAL PACKET RADIO SERVICE SUPPORT NODE ADDRESS

(75) Inventor: Xiaoyun Zhou, Guangdong Province (CN)

(73) Assignee: ZTE Corporation (CN)

( * ) Notice: Subject to any disclaimer, the term of this patent is extended or adjusted under 35 U.S.C. 154(b) by 42 days.

(21) Appl. No.: 13/258,505

(22) PCT Filed: Jul. 21, 2010

(86) PCT No.: PCT/CN2010/075354
§ 371 (c)(1),
(2), (4) Date: Mar. 21, 2012

(87) PCT Pub. No.: WO2011/035644
PCT Pub. Date: Mar. 31, 2011

(65) Prior Publication Data
US 2012/0170517 A1    Jul. 5, 2012

(30) Foreign Application Priority Data
Sep. 24, 2009 (CN) .......................... 2009 1 0173961

(51) Int. Cl.
*H04W 4/00* (2009.01)
*H04L 12/14* (2006.01)

(52) U.S. Cl.
CPC ............ *H04L 12/14* (2013.01); *H04L 12/1403* (2013.01)
USPC ....................................................... 370/329

(58) Field of Classification Search
USPC ........ 370/328, 329, 331, 338; 455/435.1, 436
See application file for complete search history.

(56) References Cited

U.S. PATENT DOCUMENTS

| | | | |
|---|---|---|---|
| 2009/0254494 A1* | 10/2009 | Li et al. ........................ | 705/400 |
| 2010/0217877 A1* | 8/2010 | Willars et al. ................ | 709/228 |
| 2011/0138066 A1* | 6/2011 | Kopplin et al. .............. | 709/228 |
| 2012/0059944 A1* | 3/2012 | Fernandez et al. ........... | 709/228 |
| 2012/0064878 A1* | 3/2012 | Castro Castro et al. ...... | 455/418 |

FOREIGN PATENT DOCUMENTS

| | | |
|---|---|---|
| CN | 101330453 A | 12/2008 |
| CN | 101437271 A | 5/2009 |
| WO | 2009051527 A1 | 4/2009 |

OTHER PUBLICATIONS

International Search Report for PCT/CN2010/075354 dated Oct. 11, 2010.

* cited by examiner

*Primary Examiner* — Pao Sinkantarakorn
*Assistant Examiner* — Richard K Chang
(74) *Attorney, Agent, or Firm* — Banner & Witcoff, Ltd.

(57) ABSTRACT

The present invention discloses a method and system for acquiring an address of a Serving General Radio Packet Service support node (SGSN). The method comprises: a Policy and Charging Enforcement Function (PCEF) entity providing a SGSN change event trigger to a Policy and Charging Rules Function (PCRF) entity; and the PCRF entity reporting a SGSN change event and a new address of the SGSN to the PCEF entity after receiving the SGSN change event trigger. The method solves the problem that credit control management cannot be carried out for different general radio packet service support nodes during online charging.

9 Claims, 3 Drawing Sheets

METHOD AND SYSTEM FOR ACQUIRING SERVING GENERAL PACKET RADIO SERVICE SUPPORT NODE ADDRESS

TECHNICAL FIELD

The present invention relates to the field of communication, and more especially, to a method and system for acquiring an address of a Serving General Radio Packet Service support node (Serving GRPS Support Node, SGSN).

BACKGROUND OF THE RELATED ART

The Evolved Packet System (EPS) of the 3rd Generation Partnership Project (3GPP) consists of Evolved Universal Terrestrial Radio Access Networks (E-UTRAN), Mobility Management Entities (MME), Serving Gateways (S-GW), Packet Data Network Gateways (P-GW) and Home Subscriber Servers (HSS), as shown in FIG. 1.

The MME is responsible for control plane related work, such as mobility management, processing of non-access layer signaling and management of user mobility management context. The S-GW, which is an access gateway device connected to the E-UTRAN, transfers data between the E-UTRAN and the P-GW and is responsible for caching paging data. The P-GW, which is a boundary gateway between the EPS and the packet data network (PDN), is responsible for access of the PDN, transferring data between the EPS and the PDN, etc. The UE might also access to the upgraded SGSN through the UTRAN, and then the SGSN accesses to packet services by a connection the P-GW and the S-GW. This upgraded SGSN is called as an S4 SGSN. It executes control plane interaction with the MME via the S3 interface and executes user plane interaction with the S-GW via the S4 interface.

Provided that the EPS system supports the Policy and Charging Control (PCC), a Policy and Charging Rules Function (PCRF) entity makes policy and charging rules, and is connected to an Application Function (AF) entity in an operator's Internet Protocol (IP) service network via the Rx interface to acquire service information, so as to generate the service information of the PCC strategy. When the GTP protocol is used in the S5 interface between the S-GW and the P-GW, a Policy and Charging Enforcement Function (PCEF) entity resides in the P-GW. The PCRF entity exchanges information with the P-GW via the Gx interface and is responsible for initiating establishment, modification and release of a bearer to ensure the quality of service (QoS for short) of service data and perform charging control. When the Proxy Mobile IP (PMIP) is used in the S5 interface between the S-GW and the P-GW, a Bearer Binding and Event Report Function (BBERF) entity resides in the S-GW, information is exchanged between the S-GW and the PCRF entity via the Gxc interface, the BBERF entity is responsible for initiating the establishment, modification and release of the bearer to ensure the QoS of the service data, and the PCEF entity performs the charging control.

The EPS system supports online charging and offline charging of the corresponding user. For the online charging, the P-GW interacts with an Online Charging System (OCS) via the Gy interface, and implements the credit control and management. For the offline charging, the P-GW interacts with the Offline Charging System (OFCS) via the Gz interface and reports billing information.

For the online charging, during the implementation of the credit control and management, the OCS provides credit authorization for services accessed by the user according to the user subscription and the operator's strategy and sends a re-authorization trigger for the P-GW to re-request the credit. For example, the P-GW must re-request the credit from the OCS when the SGSN serving the UE changes.

Then, in a frame shown in FIG. 1, when the PMIP protocol is used between the S-GW and the P-GW, the P-GW is unaware of the change of the SGSN such that the P-GW cannot re-request the credit from the OCS.

The same problem also exists in an EPS home route roaming scenario shown in FIG. 2 and an EPS local breakout roaming scenario shown in FIG. 3, in which the P-GW is also unaware of the change of the SGSN such that the P-GW cannot re-request the credit from the OCS.

CONTENT OF THE INVENTION

The technical problem to be solved by the present invention is to provide a method and system for acquiring an address of a SGSN such that a P-GW can be aware of change of the SGSN and re-request credit from an OCS.

In order to solve the aforementioned problem, the present invention provides a method for acquiring an address of a SGSN comprising:

a PCEF entity providing a SGSN change event trigger to a PCRF entity; and the PCRF entity reporting a SGSN change event and a new address of the SGSN to the PCEF entity after receiving the SGSN change event trigger.

In the method, the step of the PCRF entity reporting the SGSN change event and the new address of the SGSN to the PCEF entity after receiving the SGSN change event trigger comprises:

the PCRF entity subscribing to the SGSN change event trigger to a Bearer Binding and Event Report Function (BBERF) entity after receiving the SGSN change event trigger from the PCEF;

the BBERF entity installing the SGSN change event trigger, and reporting the SGSN change event and the new address of the SGSN to the PCRF entity when the BBERF entity detects the SGSN change event; and the PCRF entity reporting the received SGSN change event and new address of the SGSN to the PCEF.

The PCEF entity provides the PCRF entity with the SGSN change event trigger via an event report indication.

The event report indication includes event triggers, the values of which at least contain the change of the SGSN.

The PCRF entity reports the SGSN change event and the new address of the SGSN to the PCEF entity through the event report indication.

The present invention also discloses a system for acquiring an address of a SGSN comprising a PCEF entity and a PCRF entity, wherein:

the PCEF entity is configured to provide a SGSN change event trigger to the PCRF entity, and receive and store a SGSN change event and a new address of the SGSN reported by the PCRF; and the PCRF entity is configured to receive the SGSN change event trigger and report the SGSN change event and the new address of the SGSN to the PCEF entity.

The system also comprises a BBERF entity, and the PCRF entity is further configured to subscribe to the SGSN change event trigger to the BBERF entity after receiving the SGSN change event trigger from the PCEF, and receive the SGSN change event and the new address of the SGSN reported by the BBERF entity; and the BBERF entity is further configured to receive the SGSN change event trigger subscribed by the PCRF entity, install the SGSN change event trigger, and report the SGSN change event and the new address of the SGSN to the PCRF entity when detecting the change of the SGSN.

The PCEF entity is configured to provide the SGSN change event trigger to the PCRF entity via an event report indication.

The event report indication includes event triggers, the values of which at least contain the change of the SGSN.

The PCRF entity is configured to report the SGSN change event and the new address of the SGSN to the PCEF entity via the event report indication.

The technical scheme of the present invention solves the problem that credit control management cannot be carried out for different general radio packet service support nodes during online charging.

PREFERRED EMBODIMENTS OF THE PRESENT INVENTION

The main idea of the present invention is that a PCEF entity in a P-GW provides a PCRF entity with a SGSN change event trigger, and the PCRF entity receiving the event trigger can subscribe to the SGSN change event trigger to the other network element (such as a BBERF entity), the other network element (such as the BBERF entity) reports a SGSN change event and a new address of the SGSN (that is, an address of the SGSN subsequent to the SGSN change event) to the PCRF entity when detecting the SGSN change event, and the PCRF entity forwards the event and the new address of the SGSN to the PCEF entity.

The technical scheme of the present invention will be further described in detail below in conjunction with the accompanying drawings and specific embodiments.

A system for acquiring an address of a GSGN comprises a PCEF entity, a PCRF entity and a BBERF entity, various functions of which will be described below.

The PCEF entity residing in the P-GW is mainly used to acquire a SGSN change trigger, and provide a SGSN change event trigger to the PCRF entity according to the acquired SGSN change trigger, and receive and store a SGSN change event and a new address of the SGSN (that is, an address of the SGSN subsequent to the SGSN change event) reported by the PCRF entity.

The SGSN change trigger acquired by the PCEF entity may come from a credit re-authorization trigger of an OCS or be configured by the PCEF entity itself, and be provided to the PCRF entity through an event report indication.

The PCRF entity is mainly used to receive the SGSN change event trigger provided by the PCEF entity, subscribe to the SGSN change event trigger to the BBERF entity according to the event trigger, and receive the SGSN change event and the new address of the SGSN reported by the BBERF entity, and send the received SGSN change event and new address of the SGSN to the PCEF entity.

The PCRF entity carries the SGSN change event and the new address of the SGSN to be reported to the PCEF entity into the event report indication.

The BBERF entity is used to receive a request for subscribing to the SGSN change event trigger initiated by the PCRF entity, detect the change of the SGSN in real time, and report the SGSN change event and the new address of the SGSN to the PCEF entity upon the change of the SGSN.

In other embodiments, when the PCRF entity receives the SGSN change event trigger provided by the PCEF entity, it might also subscribe to the SGSN change event trigger to the other network element, and forward the SGSN change event and the new address of the SGSN reported by other network element to the PCEF entity.

Specific processes in which the system described above acquires an address of a serving general radio packet service support node in different EPS roaming scenarios will be described below.

The First Embodiment

Figure 1:
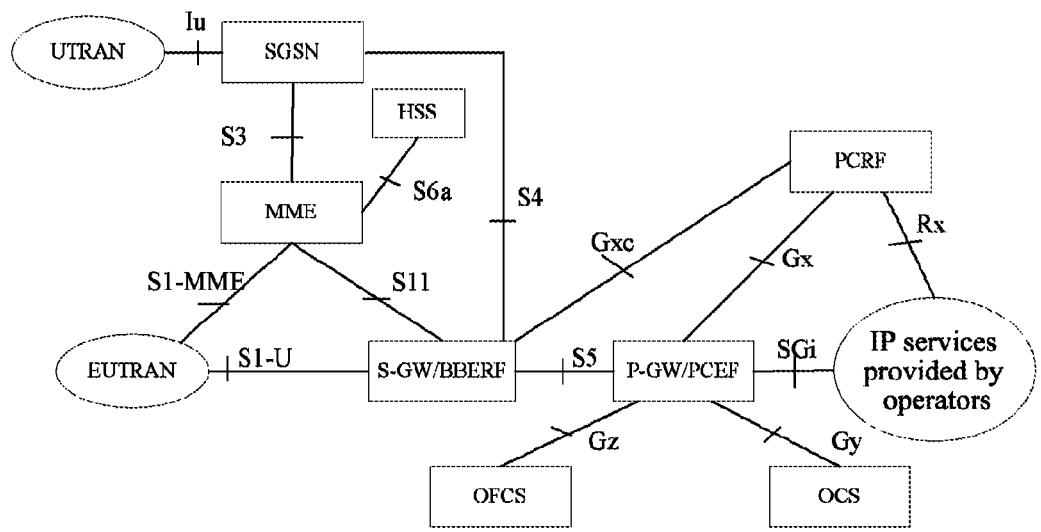
FIG. 1 is a frame diagram of the existing EPS non-roaming scenario.
Figure 2:
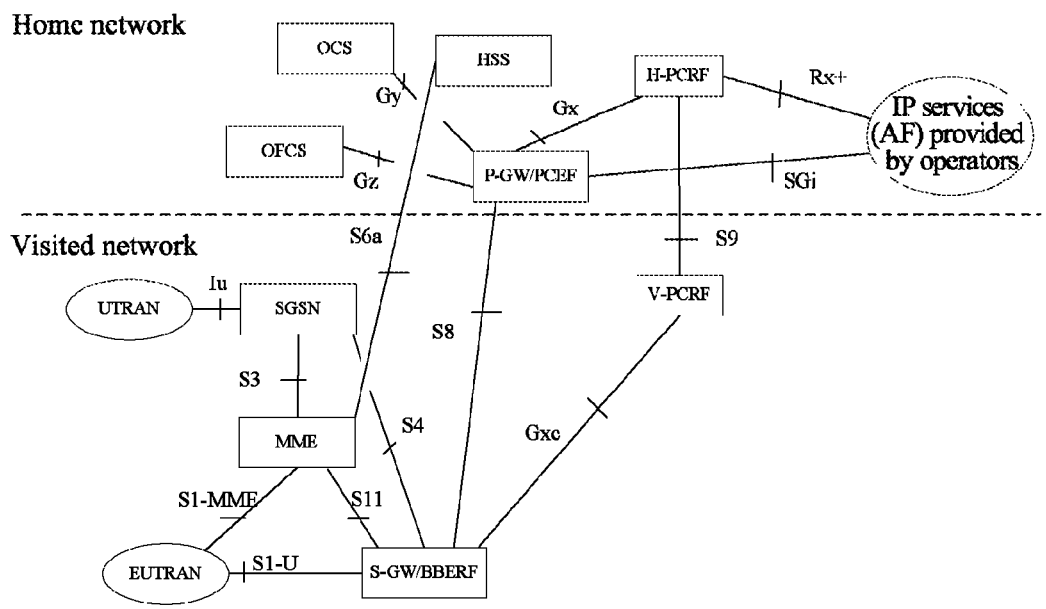
FIG. 2 is a frame diagram of the existing EPS home route roaming scenario.
Figure 3:
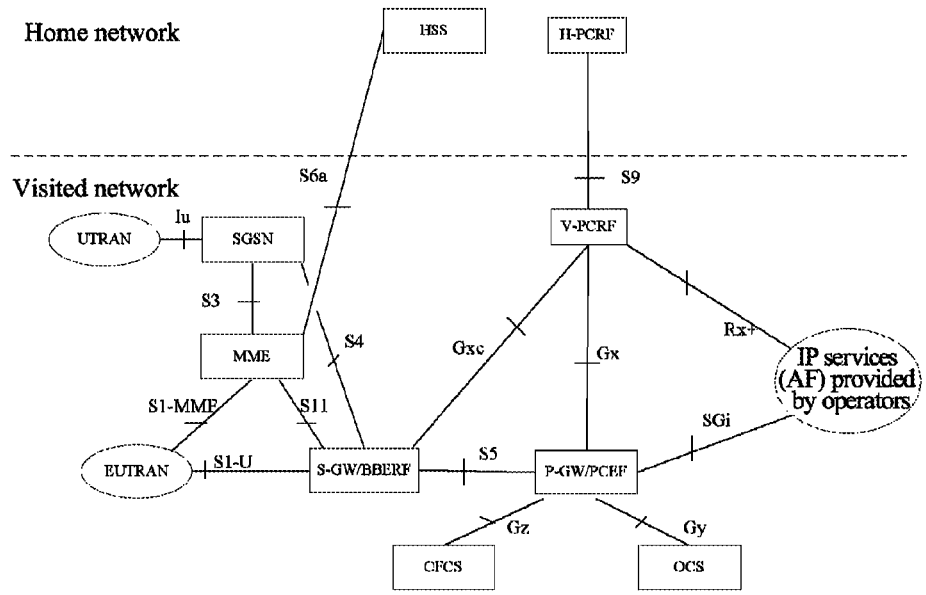
FIG. 3 is a frame diagram of the existing EPS local breakout roaming scenario.
Figure 4:
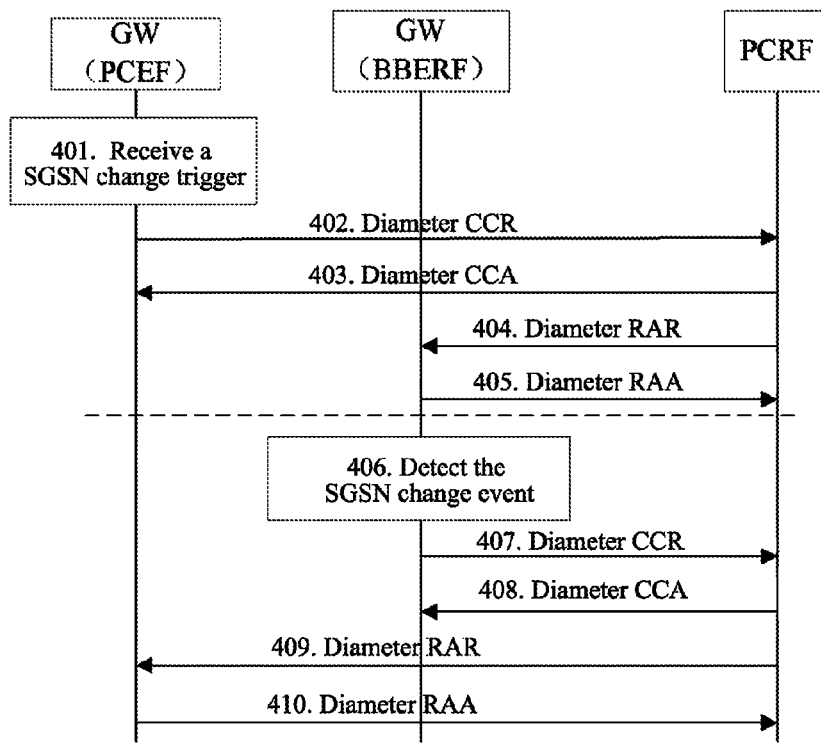
FIG. 4 is a flow chart of a process in the non-roaming scenario in accordance with the first embodiment of the present invention.

In this embodiment, a process in which a PCEF entity in a P-GW acquires a SGSN change event and a new address of the SGSN (i.e., an address of the SGSN subsequent to the change of the SGSN) in a non-roaming scenario is described. As shown in FIG. 4, the process comprises the following steps.

In step S401, the PCEF entity in the P-GW receives a SGSN change trigger.

In this step, the PCEF entity may receive the SGSN change trigger, which may be a credit re-authorization trigger, by re-authorization with an OCS.

In other embodiments, the SGSN change trigger might also be configured in the PCEF entity in advance.

In step S402, the PCEF entity sends a Diameter Credit-Control-Request (Diameter CCR) message carrying an event report indication to the PCRF entity, the event report indication including event triggers, the values of which at least contain SGSN_CHANGE to provide a SGSN change event trigger to the PCRF.

In step S403, the PCRF entity receives the Diameter CCR message and stores the event report indication contained in the message, and then returns a Diameter Credit-Control-Answer (Diameter CCA) message to the PCEF entity.

In step S404, the PCRF entity determines whether it has subscribed to the SGSN change event trigger to the BBERF entity, if yes, the process proceeds to step S406, otherwise, the PCRF entity sends a Diameter Re-Auth-Request (Diameter RAR) message to the BBERF entity, the Diameter RAR message carrying event triggers, the values of which at least contain SGSN_CHANGE to subscribe to the SGSN change event trigger to the BBERF entity, and the process proceeds to step S405.

In step S405, the BBERF entity receives the Diameter RAR message, and installs the subscribed event trigger based on the Diameter RAR message, and returns a Diameter RAA (Re-Auth-Answer) message to the PCRF entity.

In step S406, when a UE moves to cause the SGSN to change, the BBERF entity detects the SGSN change event.

In step S407, the BBERF entity sends a Diameter CCR message carrying event triggers and a new address of the SGSN to the PCRF, wherein the values of the event triggers at least contain SGSN_CHANGE.

In step S408, the PCRF entity receives the Diameter CCR message, stores the event triggers and the new address of the SGSN contained in the message, and returns a Diameter CCA message to the BBERF entity.

In step S409, the PCRF entity sends a Diameter RAR message carrying an event report indication to the PCEF entity, wherein the event report indication carries event triggers and an new address of the SGSN, and the values of the event triggers at least contain SGSN_CHANGE, and reports the SGSN change event and the new address of the SGSN to the PCEF entity.

In step S410, the PCEF entity receives the Diameter RAR message to acquire the SGSN change event and the new address of the SGSN, and returns a Diameter RAA message to the PCRF entity.

The Second Embodiment

Figure 5:
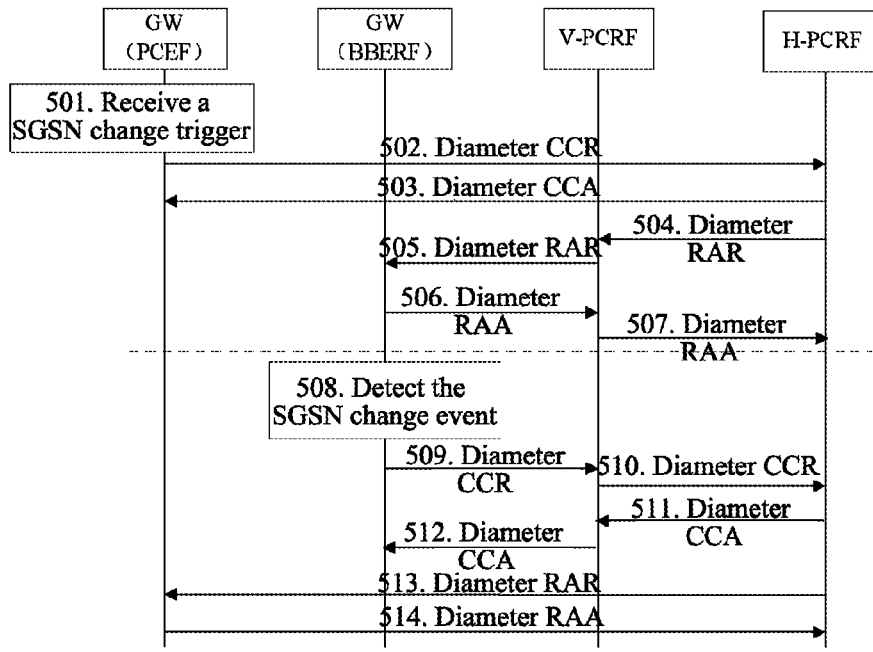
FIG. 5 is a flow chart of a process in the home route roaming scenario in accordance with the second embodiment of the present invention.

In this embodiment, a process in which a PCEF entity in a P-GW acquires a SGSN change event and a new address of the SGSN in a home route roaming scenario is described. As shown in FIG. 5, the process comprises the following steps.

In step S501, the PCEF entity in the P-GW receives a SGSN change trigger.

In this step, the PCEF entity may receive the SGSN change trigger, which may be a credit re-authorization trigger, by re-authorization with an OCS.

In other embodiments, the SGSN change trigger might also be configured in the PCEF entity in advance.

In step S502, the PCEF entity sends a Diameter CCR message carrying an event report indication to a home PCRF (H-PCRF) entity, the event report indication including event triggers, the values of which at least contain SGSN_CHANGE to provide a SGSN change event trigger to the PCRF.

In step S503, the H-PCRF entity receives the Diameter CCR message and stores the event report indication contained in the message, and returns a Diameter CCA message to the PCEF entity.

In step S504, the H-PCRF entity determines whether it has subscribed to the SGSN change event trigger to a visited BBERF, if yes, the process proceeds to step S508, otherwise, the process proceeds to step S505.

In step 505, the H-PCRF entity sends a Diameter RAR message to the BBERF via the visited PCRF (V-PCRF) entity, the Diameter RAR message carrying event triggers, the values of which at least contain SGSN_CHANGE.

In step S506, the BBERF entity receives the Diameter RAR message, and installs the subscribed event triggers based on the Diameter RAR message, and returns a Diameter RAA (Re-Auth-Answer) message to the V-PCRF entity.

In step S507, the V-PCRF entity returns the Diameter RAA message to the H-PCRF entity.

In step S508, when a UE moves to cause the SGSN to change, the BBERF entity detects the SGSN change event.

In step S509, the BBERF entity sends a Diameter CCR message carrying event triggers and a new address of the SGSN to the V-PCRF, wherein the values of the event triggers at least contain SGSN_CHANGE.

In step S510, the V-PCRF entity sends a Diameter CCR message carrying event triggers and a new address of the SGSN to the H-PCRF, wherein the values of the event triggers at least contain SGSN_CHANGE.

In step S511, the H-PCRF entity receives the Diameter CCR message, stores the event triggers and the new address of the SGSN contained in the message, and returns a Diameter CCA message to the V-PCRF entity.

In step S512, the V-PCRF entity receives and forwards the Diameter CCA message to the BBERF.

In step S513, the H-PCRF entity sends a Diameter RAR message carrying an event report indication to the PCEF entity, wherein the event report indication carries event triggers and a new address of the SGSN, and the values of the event triggers at least contain SGSN_CHANGE, and reports the SGSN change event and the new address of the SGSN to the PCEF entity.

In step S514, the PCEF entity receives the Diameter RAR message to acquire the SGSN change event and the new address of the SGSN, and returns a Diameter RAA message to the H-PCRF entity.

The Third Embodiment

Figure 6:
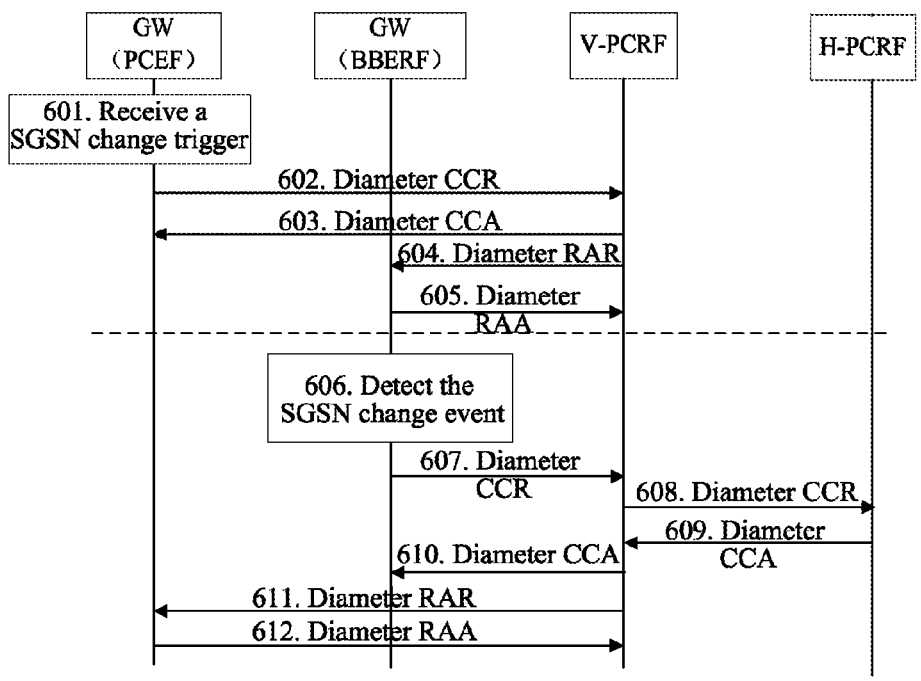
FIG. 6 is a flow chart of a process in the local breakout roaming scenario in accordance with the third embodiment of the present invention.

In this embodiment, a process in which a PCEF entity in a P-GW acquires a SGSN change event and a new address of the SGSN in a local breakout roaming scenario is described. As shown in FIG. 6, the process comprises the following steps.

In step S601, the PCEF entity in the P-GW receives a SGSN change trigger.

In this step, the PCEF entity may receive the SGSN change trigger, which may be a credit re-authorization trigger, by re-authorization with an OCS.

In other embodiments, the SGSN change trigger might also be configured in the PCEF entity in advance.

In step S602, the PCEF entity sends a Diameter CCR message carrying an event report indication to a V-PCRF entity, the event report indication including event triggers, the values of which at least contain SGSN_CHANGE to provide a SGSN change event trigger to the PCRF.

In step S603, a V-PCRF entity receives the Diameter CCR message and stores the event report indication contained in the message, and returns a Diameter CCA message to the PCEF entity.

In step S604, the V-PCRF entity determines whether it has subscribed to the SGSN change event trigger to the BBERF entity, if yes, the process proceeds to step S606, otherwise, the V-PCRF sends a Diameter RAR message to the BBERF entity, the Diameter RAR message carrying event triggers, the values of which at least contain SGSN_CHANGE, and the process proceeds to step S605.

In step S605, the BBERF entity receives the Diameter RAR message, and installs the subscribed event triggers based on the Diameter RAR message, and returns a Diameter RAA message to the V-PCRF entity.

In step S606, when a UE moves to cause the SGSN to change, the BBERF entity detects the SGSN change event.

In step S607, the BBERF entity sends a Diameter CCR message carrying event triggers and a new address of the SGSN to the V-PCRF, wherein the values of the event triggers at least contain SGSN_CHANGE.

In step S608, the V-PCRF entity determines whether it has subscribed to the SGSN change event trigger to the BBERF entity, if not, the process proceeds to step S610, otherwise, the V-PCRF sends a Diameter CCR message carrying event triggers and a new address of the SGSN to the BBERF entity, wherein the values of the event triggers at least contain SGSN_CHANGE, and the process proceeds to step S609.

In step S609, the H-PCRF entity receives the Diameter CCR message, stores the event triggers and the new address of the SGSN contained in the message, and returns a Diameter CCA message to the V-PCRF.

In step S610, the V-PCRF entity returns the Diameter CCA message to the BBERF entity.

In step S611, the V-PCRF entity sends a Diameter RAR message carrying an event report indication to the PCEF entity, wherein the event report indication includes event triggers and a new address of the SGSN, and the values of the event triggers at least contain SGSN_CHANGE to report the SGSN change event and the new address of the SGSN to the PCEF entity.

In step S612, the PCEF entity receives the Diameter RAR message to acquire the SGSN change event and the new address of the SGSN, and returns a Diameter RAA message to the PCRF entity.

Obviously, it may be understood by those skilled in the art that all modules or steps in the present invention can be implemented by general-purposed computing devices, and can be integrated into a single computing device or distributed across a network consisting of a plurality of computing devices. Optionally, they can be implemented using program codes executable by the computing devices so as to be stored in storage devices and executed by the computing devices, or they can be made into various integrated circuit modules, or some modules or steps of them can be made into a single integrated circuit module. Thus, the present invention is not limited to any specific combination of hardware and software.

The above description is only the preferred embodiments of the present invention and is not intended to limit the present invention. Various modifications and variations to the present invention may be made by those skilled in the art. Any modification, equivalent substitution and improvement made within the spirit and principle of the present invention should be covered in the protection scope of the present invention.

INDUSTRIAL APPLICABILITY

The technical scheme of the present invention solves the problem that credit control management cannot be carried out for different general radio packet service support nodes during online charging.

What is claimed is:

1. A method for acquiring an address of a Serving General Radio Packet Service support node (SGSN) comprising:
    a Policy and Charging Enforcement Function (PCEF) entity providing a SGSN change event trigger to a Policy and Charging Rules Function (PCRF) entity; and
    the PCRF entity reporting a SGSN change event and a new address of the SGSN to the PCEF entity after receiving the SGSN change event trigger;
    wherein the step of the PCRF entity reporting the SGSN change event and the new address of the SGSN to the PCEF entity after receiving the SGSN change event trigger comprises:
        the PCRF entity subscribing the SGSN change event trigger to a Bearer Binding and Event Report Function (BBERF) entity after receiving the SGSN change event trigger from the PCEF,
        the BBERF entity installing the SGSN change event trigger, and reporting the SGSN change event and the new address of the SGSN to the PCRF entity when the BBERF entity detects the SGSN change event, and
        the PCRF entity reporting the SGSN change event and new address of the SGSN to the PCEF.

2. The method according to claim 1, wherein
    the PCEF entity provides the PCRF entity with the SGSN change event trigger via an event report indication.

3. The method according to claim 1, wherein
    the PCRF entity reports the SGSN change event and the new address of the SGSN to the PCEF entity through an event report indication.

4. The method according to claim 2, wherein
    the event report indication includes event triggers, the values of which at least contain the change of the SGSN.

5. A system for acquiring an address of a Serving General Radio Packet Service support node (SGSN) comprising a Policy and Charging Enforcement Function (PCEF) entity and a Policy and Charging Rules Function (PCRF) entity, wherein:
    the PCEF entity is configured to provide a SGSN change event trigger to the PCRF entity, and receive and store a SGSN change event and a new address of the SGSN reported by the PCRF;
    the PCRF entity is configured to receive the SGSN change event trigger and report the SGSN change event and the new address of the SGSN to the PCEF entity; and
    the system further comprises a Bearer Binding and Event Report Function (BBERF) entity, wherein
        the PCRF entity is further configured to subscribe the SGSN change event trigger to the BBERF entity after receiving the SGSN change event trigger from the PCEF, and receive the SGSN change event and the new address of the SGSN reported by the BBERF entity; and
        the BBERF entity is further configured to receive the SGSN change event trigger subscribed by the PCRF entity, install the SGSN change event trigger, and report the SGSN change event and the new address of the SGSN to the PCRF entity when detecting the SGSN change event.

6. The system according to claim 5, wherein
    the PCEF entity is configured to provide the SGSN change event trigger to the PCRF entity via an event report indication.

7. The system according to claim 5, wherein
    the PCRF entity is configured to report the SGSN change event and the new address of the SGSN to the PCEF entity via an event report indication.

8. The system according to claim 6, wherein
    the event report indication includes event triggers, the values of which at least contain the change of the SGSN.

9. A Policy and Charging Rules Function (PCRF) entity, comprising:
    a first port module, configured to receive a Serving General Radio Packet Service support node (SGSN) change event trigger and report a SGSN change event and a new address of the SGSN to a Policy and Charging Enforcement Function (PCEF) entity;
    a second port module configured to subscribe the SGSN change event trigger to a Bearer Binding and Event Report Function (BBERF) entity after receiving the SGSN change event trigger from the PCEF, and receive the SGSN change event and the new address of the SGSN as reported by the BBERF entity when the SGSN change event is detected by the BBERF entity.

* * * * *

UNITED STATES PATENT AND TRADEMARK OFFICE
CERTIFICATE OF CORRECTION

PATENT NO. : 8,670,400 B2
APPLICATION NO. : 13/258505
DATED : March 11, 2014
INVENTOR(S) : Xiaoyun Zhou It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 40 days.

Signed and Sealed this

Twenty-ninth Day of September, 2015

Michelle K. Lee
*Director of the United States Patent and Trademark Office*